United States Patent
Nagayasu (10) Patent No.: US 9,315,163 B2
(45) Date of Patent: Apr. 19, 2016

(54) HARNESS PROTECTOR AND WIRE HARNESS ROUTING STRUCTURAL PART

(75) Inventor: Daiki Nagayasu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 143 days.

(21) Appl. No.: 14/117,196

(22) PCT Filed: Feb. 22, 2012

(86) PCT No.: PCT/JP2012/054206
§ 371 (c)(1),
(2), (4) Date: Nov. 12, 2013

(87) PCT Pub. No.: WO2013/031260
PCT Pub. Date: Mar. 7, 2013

(65) Prior Publication Data
US 2014/0332265 A1    Nov. 13, 2014

(30) Foreign Application Priority Data

Aug. 29, 2011  (JP) .................................. 2011-185733

(51) Int. Cl.
| | |
|---|---|
| *B60R 16/02* | (2006.01) |
| *H01B 17/26* | (2006.01) |
| *H02G 3/06* | (2006.01) |
| *H02G 11/00* | (2006.01) |

(Continued)

(52) U.S. Cl.
CPC ............ *B60R 16/0222* (2013.01); *H01B 17/26* (2013.01); *H02G 3/0691* (2013.01); *H02G 11/00* (2013.01); *H02G 3/0487* (2013.01); *H02G 3/22* (2013.01)

(58) Field of Classification Search
CPC ............................ B60R 16/0222; H01B 17/56
USPC ........................................................ 174/72 A
See application file for complete search history.

(56) References Cited

U.S. PATENT DOCUMENTS

| | | | | |
|---|---|---|---|---|
| 6,085,795 | A | * | 7/2000 | Ogawa et al. .................. 138/108 |
| 6,092,859 | A | * | 7/2000 | Serizawa et al. ............ 296/146.7 |

(Continued)

FOREIGN PATENT DOCUMENTS

| | | |
|---|---|---|
| JP | 08-138471 | 5/1996 |
| JP | 10-112229 | 4/1998 |

(Continued)

OTHER PUBLICATIONS

International Search Report, mail date is Apr. 24, 2012.

*Primary Examiner* — Timothy Thompson
*Assistant Examiner* — Charles Pizzuto
(74) *Attorney, Agent, or Firm* — Greenblum & Bernstein, P.L.C.

(57) ABSTRACT

An edge protector includes a tubular main body capable of being inserted into a through-hole in an insertion direction and including an installation hole enabling the wire harness to be installed, and an engagement structural part flaring from an outer circumference of the main body and capable of engaging in a through direction with an opening edge of the through-hole. The installation hole includes a small space formed in a shape following the outer circumference of the wire harness and capable of positioning the wire harness within a specific range with respect to the through-hole in a radial direction relative to a center axis, and a large space provided to a portion including a rear end in the insertion direction, the large space including an interior space expanding further than the small space toward an outer periphery on at least one side of the small space in a circumferential direction.

8 Claims, 6 Drawing Sheets

(51) Int. Cl.
  *H02G 3/04* (2006.01)
  *H02G 3/22* (2006.01)

(56) References Cited

U.S. PATENT DOCUMENTS

| 2002/0000499 | A1* | 1/2002 | Aoki et al. | 248/74.4 |
| 2006/0090920 | A1* | 5/2006 | Fujita | 174/72 A |

FOREIGN PATENT DOCUMENTS

| JP | 11-150833 | 6/1999 |
| JP | 2001-332144 | 11/2001 |
| JP | 2002-199558 | 7/2002 |
| JP | 2006-131154 | 5/2006 |
| JP | 2010-287369 | 12/2010 |

* cited by examiner

HARNESS PROTECTOR AND WIRE HARNESS ROUTING STRUCTURAL PART

FIELD OF THE INVENTION

The present invention relates to a technology protecting a wire harness, the wire harness being passed through a through-hole.

BACKGROUND OF THE INVENTION

When a wire harness installed in an automobile and the like is passed through a through-hole formed in a metal panel and the like, damage resulting from contact between the wire harness and an opening edge of the through-hole must be prevented.

Patent Literature 1 discloses a wire protection member used as a grommet interior and edge protector, the wire protection member being attached to an edge of a panel hole formed in a vehicle panel and the like to protect wires inserted through the hole. The wire protection member is assembled in an annular shape by connecting ends of two semi-annular main bodies to each other, configuring a structure engaging with the panel hole.

The wire protection member used as the grommet interior of a grommet is combined with a grommet exterior for use, the grommet exterior configured with a flexible material for sealing a gap between the panel hole and the wires. The grommet exterior is fitted together with a flange of the grommet interior and mounted on the grommet interior. In addition, by engaging an engagement protrusion of the grommet interior on the edge of the panel hole, the grommet is fixated to the panel. Also, the wire protection member used as the edge protector is fixated to the panel as a single body due to the engagement protrusion engaging with the edge of the panel hole.

RELATED ART

Patent Literature

Patent Literature 1: Japanese Patent Laid-open Publication No. H8-138471

SUMMARY OF THE INVENTION

Problems to be Solved by the Invention

In this regard, in Patent Literature 1, the wires to be protected by the wire protection member (hereafter, a wire harness) may shift within the wire protection member because they are not fixed with respect to the panel in a position in a radial direction relative to a center axis. In other words, when the wire protection member is used as the grommet interior, the grommet exterior is tightly attached to an outer circumference of the wire harness, but the wire harness may shift accompanying elastic deformation of an exterior grommet because the grommet exterior is itself formed with a flexible material. Further, even when the wire protection member is used as the edge protector, the wire harness may freely shift within the edge protector.

In response to these problems, in order to fix the wire harness with respect to the panel in a position in the radial direction relative to the center axis, an inner circumference of the wire protection member may be formed in a shape following the outer circumference of the wire harness. However, in a case where the wire protection member is present in a mode following the outer circumference of the wire harness, when attempting to bend the wire harness at a position proximal to the wire protection member, a large load is placed on the wire harness and bending deformation is difficult.

Thus, the present invention has as an object to alleviate a load accompanying bending deformation and to facilitate bending of a wire harness.

Means for Solving the Problems

A first aspect is a harness protector attached to an opening edge of a through-hole in a panel, the through-hole being formed in the panel having a wire harness comprising bundled wires passed therethrough. The harness protector includes a tubular main body capable of being inserted into the through-hole in an insertion direction and having an installation hole enabling the wire harness to be installed, and an engagement structural part formed in a shape that flares from an outer circumference of the main body and capable of engaging in a through direction of the through-hole with the opening edge of the through-hole. The installation hole includes a small space formed in a shape following the outer circumference of the wire harness and capable of positioning the wire harness with respect to the through-hole within a specific range in a radial direction relative to a center axis, and a large space provided to a portion including at least one of a forward end and a rear end in the insertion direction, the large space including an interior space expanding further than the small space toward an outer periphery on at least one side of the small space in a circumferential direction. The harness protector is further configured by a pair of separate members brought adjacent in an assembly direction and assembled in a tubular shape, and each of the separate members is formed to integrally comprise: a divided main body forming a portion of the main body; a divided engagement structural part forming a portion of the engagement structural part; and a pressure portion formed on the divided main body at a location on the forward side of the divided engagement structural part in the insertion direction, the pressure portion including a pressure surface facing rearward in the assembly direction. The pressure portion, as seen in a front view, is formed in a shape having the pressure surface on a portion overlapping with both ends of the divided main body on a rear side in the assembly direction.

A second aspect is the harness protector according to the first aspect, wherein the large space is formed in a shape gradually expanding in an outer peripheral direction toward the forward end or the rear end in the insertion direction.

A third aspect is the harness protector according to the first or second aspects, wherein the small space is formed in a shape long in one direction as seen in a front view, and the large space is formed in a shape expanding toward the outer periphery on at least one side of the small space in a direction orthogonal to a major axis direction of the small space, as seen in a front view.

A fourth aspect is the harness protector according to any one of the first through third aspects, wherein the large space is formed in a shape expanding further than the small space toward the outer periphery in the entire circumferential direction.

A fifth aspect is the harness protector according to any one of the first through fourth aspects, wherein the harness protector further includes a positioning rib projecting toward the inner periphery from the small space of the installation hole and extending along the circumferential direction.

A seventh aspect is a wire harness routing structural part for routing a wire harness comprising bundled wires and being routed between a body of a vehicle and a door through a through-hole formed on the body. The wire harness routing structural part includes the wire harness and a harness protector including a tubular main body inserted into the through-hole in an insertion direction and having an installation hole where the wire harness is installed, and an engagement structural part formed in a shape flaring from an outer circumference of the main body and capable of engaging in a through direction of the through-hole with an opening edge of the through-hole. The installation hole includes a small space having a shape following the outer circumference of the wire harness, and a large space provided to a portion including a door-side end in the insertion direction, the large space including an interior space expanding further than the small space toward an outer periphery on at least one side of the small space in a circumferential direction. The harness protector is configured by a pair of separate members brought adjacent in an assembly direction and assembled in a tubular shape, each of the separate members being formed to integrally comprise: a divided main body forming a portion of the main body; a divided engagement structural part forming a portion of the engagement structural part; and a pressure portion formed on the divided main body at a location on the forward side of the divided engagement structural part in the insertion direction, the pressure portion including a pressure surface facing rearward in the assembly direction. The pressure portion, as seen in a front view, is formed in a shape having the pressure surface on a portion overlapping with both ends of the divided main body on a rear side in the assembly direction. The wire harness routing structural part further includes an extra length absorption part accommodating a portion of the wire harness routed within the door with a space enabling the wire harness to be redirected.

An eighth aspect is the wire harness routing structural part according to the seventh aspect, wherein, in a state where the door is closed, the extra length absorption part includes, further toward a vehicle interior than the installation hole of the harness protector, an insertion opening into which the wire harness is inserted. In addition, the large space of the harness protector is formed in a shape expanding further than the small space toward the outer periphery on both sides of a vehicle interior/exterior direction of the small space.

A ninth aspect is the wire harness routing structural part according to the seventh or eighth aspect, wherein the large space of the harness protector is formed in a shape expanding further than the small space toward the outer periphery in the entire circumferential direction.

Effect of the Invention

According to the harness protector according to the first aspect, the installation hole of the main body inserted into the through-hole includes the small space provided to a forward portion in the insertion direction, the small space being formed in a shape following the outer circumference of the wire harness and capable of positioning the wire harness with respect to the through-hole within the specific range in the radial direction relative to the center axis, and the large space provided to the portion including at least one of the forward end and the rear end in the insertion direction, the large space including the interior space expanding further than the small space toward the outer periphery on at least one side of the small space in the circumferential direction. The harness protector is further configured by a pair of separate members brought adjacent in an assembly direction and assembled in a tubular shape, and each of the separate members is formed to integrally comprise: a divided main body forming a portion of the main body; a divided engagement structural part forming a portion of the engagement structural part; and a pressure portion formed on the divided main body at a location on the forward side of the divided engagement structural part in the insertion direction, the pressure portion including a pressure surface facing rearward in the assembly direction. The pressure portion, as seen in a front view, is formed in a shape having the pressure surface on a portion overlapping with both ends of the divided main body on a rear side in the assembly direction. Therefore, the wire harness, a position thereof being regulated in the radial direction relative to the center axis of the main body by the small space, can be bent even within the large space with a position of the installation hole as a pivot point, the position of the installation hole being further rearward or forward than the insertion-direction forward end or rear end. Accordingly, a load accompanying bending deformation can be alleviated and the wire harness can be bent more readily.

According to the harness protector according to the second aspect, the large space is formed in a shape gradually expanding in the outer peripheral direction toward the forward end or the rear end in the insertion direction. Therefore, when the wire harness is bent, the wire harness can bend gently along the inner circumference of the large space and a load on the wire harness can be further alleviated by avoiding strong interference.

According to the harness protector according to the third aspect, the small space is formed in a shape long in one direction, as seen in a front view, and the large space is formed in a shape expanding toward the outer periphery on at least one side of the small space in a direction orthogonal to the major axis direction of the small space, as seen in a front view. Therefore, when a flat wire harness is to be protected, the wire harness can be bending deformed even within the large space in a minor axis direction, which is the direction in which the wire harness is chiefly bent. Accordingly, the load accompanying the bending deformation can be alleviated and the wire harness can be bent more readily.

According to the harness protector according to the fourth aspect, the large space is formed in a shape expanding further than the small space toward the outer periphery in the entire circumferential direction. Therefore, the load accompanying the bending deformation can be alleviated in the entire radial direction relative to the center axis of the installation hole, and the wire harness can be bent more readily.

According to the harness protector according to the fifth aspect, the harness protector further includes the positioning rib projecting from the small space of the installation hole toward the inner periphery and extending along the circumferential direction. Therefore, in a case where the wire harness is protected, the wire harness having a corrugated tube mounted on the outer circumference of the bundled wires, the positioning rib fits together with the outer circumference of the corrugated tube, and thus the wire harness can be positioned in a center axis direction of the main body in a more compact manner.

According to the wire harness routing structural part according to the seventh aspect, the wire harness is supported by the body using the harness protector, which includes the large space having the interior space expanding further than the small space toward the outer periphery on at least one side of the small space in the circumferential direction, and is configured b a air of separate members brought adjacent in an assembly direction and assembled in a tubular shape, each of the separate members being formed to integrally comprise: a divided main body forming a portion of the main body; a divided engagement structural part forming a portion of the engagement structural part; and a pressure portion formed on the divided main body at a location on the forward side of the divided engagement structural part in the insertion direction, the pressure portion including a pressure surface facing rearward in the assembly direction. The pressure portion, as seen in a front view, is formed in a shape having the pressure surface on a portion overlapping with both ends of the divided main body on a rear side in the assembly direction. Therefore, accompanying an open/close operation of the door, or the like, the wire harness is bent by the door-side end in the insertion direction even within the large space with the position on the body side as the pivot point. Accordingly, the load from the bending deformation of the wire harness accompanying the open/close operation of the door can be alleviated and the bending performance can be improved.

According to the wire harness routing structural part according to the eighth aspect, the insertion opening of the extra length absorption part is provided further toward the vehicle interior than the installation hole of the harness protector in a state where the door is closed, and the large space of the harness protector is formed in a shape expanding further than the small space toward the outer periphery on both sides of the vehicle interior/exterior direction. Therefore, the wire harness, which is bent from the harness protector toward the vehicle interior in order to be routed within the door in the closed state of the door, is bent more gently by the door-side end of the harness protector in the insertion direction even within the large space with the body side as the pivot point, and is bent more gently toward the vehicle exterior when the door is operated to open.

According to the wire harness routing structural part according to the ninth aspect, the large space of the harness protector is formed in a shape expanding further than the small space toward the outer periphery in the entire circumferential direction. Therefore, the wire harness is bent more gently even in a case where the wire harness undergoes bending deformation in the vertical direction in addition to bending deformation in the vehicle interior/exterior direction.

MODE FOR CARRYING OUT THE INVENTION

Figure 1:
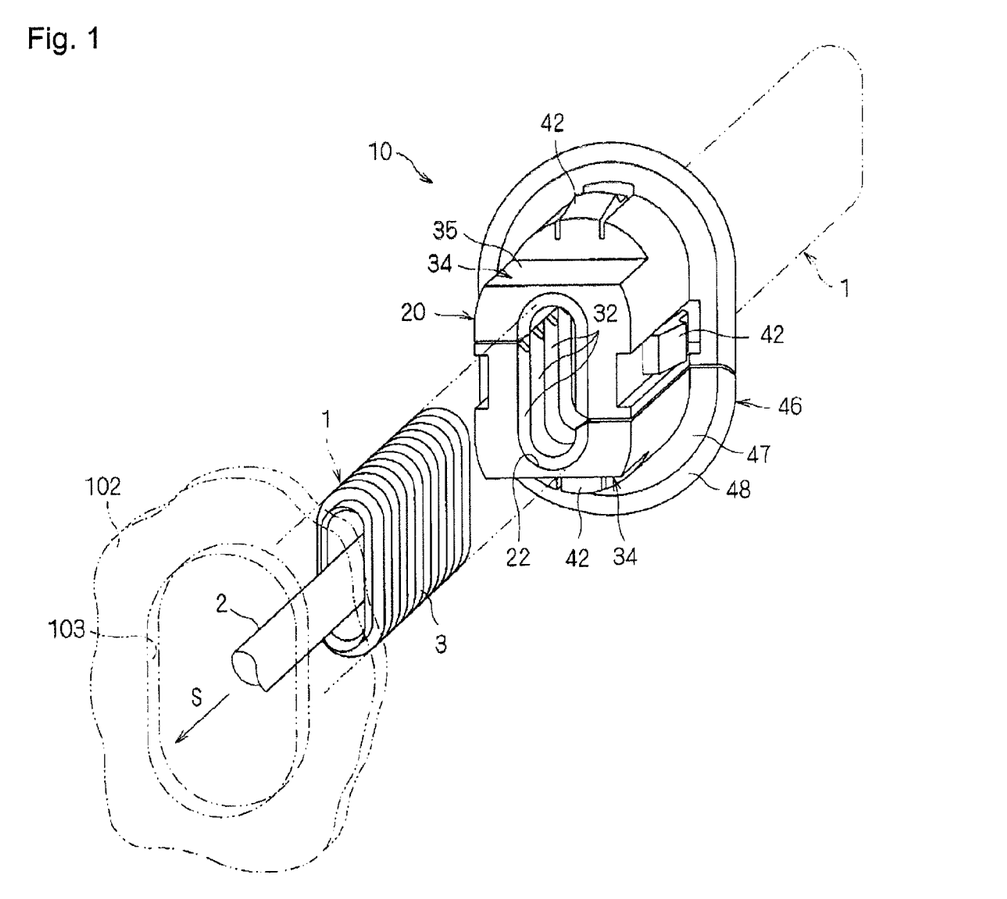
[FIG. 1] is a perspective view of an edge protector.

<Edge Protector>
Hereafter, a description is given of a configuration of an edge protector 10 according to an embodiment (see FIG. 1). The edge protector 10 is attached to an opening edge of a through-hole 103 formed in a panel 102, and is a member protecting a wire harness 1 from the opening edge (edge) of the opening 103, the wire harness 1 being routed through the through-hole 103.

The wire harness 1 to be protected by the present edge protector 10 is, for example, a wire harness installed in an automobile and includes bundled wires 2 in which a plurality of wires are bundled by tape-winding or the like. Herein, the wire harness 1 includes the bundled wires 2 and a corrugated tube 3 covering a circumference of the bundled wires 2 (see FIG. 1). The corrugated tube 3 is a protective member for protecting the bundled wires 2 from an exterior, is formed in a tube shape, and is a member having protruding peaks 4 and recessed valleys 5 along a circumferential direction, the peaks 4 and valleys 5 continuing alternatingly in an extension direction. Herein, an example is described in which the corrugated tube 3 has a flat shape where a pair of straight line portions links a pair of arced portions, as viewed in a cross-section orthogonal to the extension direction (see FIG. 1). In other words, the corrugated tube 3 has a shape that, in a cross-sectional view, is unlikely to bend in a major axis direction (has high rigidity) and is likely to bend in a minor axis direction (has high flexibility).

However, the corrugated tube 3 of the wire harness 1 to be protected is not limited to the above-noted shape and may, for example, be formed in a shape such as a circle or a rectangle, as viewed in a cross-section orthogonal to the extension direction. In addition, the wire harness 1 is not limited to including the corrugated tube 3 covering the circumference of the bundled wires 2. Instead, the wire harness 1 may include a tube-shaped protective member other than the corrugated tube 3 to cover the circumference of the bundled wires 2, or may have only the bundled wires 2, omitting the tube-shaped protective member.

The panel 102 is, for example, a metal panel configuring a body of the automobile. More specifically, on a routing path from the body toward a front side door, the through-hole 103 is formed on the routing path in order to route the wire harness 1 through the metal panel in a front pillar of the body. Herein, the through-hole 103 forms a shape where a pair of straight line portions links a pair of arced portions.

The edge protector 10 is formed in an overall tubular shape and is configured to be attachable by pressing the edge protector 10 from one side of a through direction against the opening edge of the through-hole 103. The edge protector 10 includes a main body 20, a positioning rib 32, and an engagement structural part (see FIGS. 1 to 6). Herein, the edge protector 10 is configured by a pair of separate members 110 which are brought adjacent in an assembly direction A and assembled in a tubular shape (see FIG. 7). First, a description is given of a state in which the pair of separate members 110 are assembled, then each separate member 110 is described.

The main body 20 is a tubular portion capable of being inserted into the through-hole 103 and includes an installation hole 22 enabling the wire harness 1 to be installed. In addition, in a state where the main body 20 is inserted into the through-hole 103 and the wire harness 1 is installed within the installation hole 22, the main body 20 is between the wire harness 1 and the opening edge of the through-hole 103 to protect the wire harness 1 from the opening edge of the through-hole 103 (see FIG. 6).

Herein, the main body 20 is inserted into the through-hole 103 from a first side to a second side of the panel 102 with a center axis oriented along the insertion direction. Hereafter, this direction is referred to as an insertion direction S and is used to describe an orientation of the edge protector 10 and the through-hole 103. In addition, a description of the edge protector 10 is given in which a surface looking rearward from a forward side of the insertion direction S is treated as a front face (see FIG. 2), a surface looking from a direction linking the pair of straight line portions is a lateral face (see FIG. 4), and a surface looking from a direction linking the pair of arced portions is a plan face (see FIG. 5).

A portion of the main body 20 installed on an interior of the through-hole 103 is formed to an exterior shape where a pair of straight line portions links a pair of arced portions, as viewed in a cross-section orthogonal to the center axis, the exterior shape corresponding to the shape of the through-hole 103. Further, an outer circumference of the main body 20 is set to be the same as or smaller than (herein, slightly smaller than) the through-hole 103. In other words, in a state where the main body 20 is inserted within the through-hole 103, the main body 20 is positioned in a manner where an outer circumference follows the opening edge of the through-hole 103.

In addition, a pressure portion 34 is formed on a forward lateral portion of the main body 20 in the insertion direction S, the forward lateral portion being passed through the panel 102 and installed on an interior thereof. The pressure portion 34 is concretely described in conjunction with a description of the separate members 110 configuring the edge protector 10.

Figure 6:
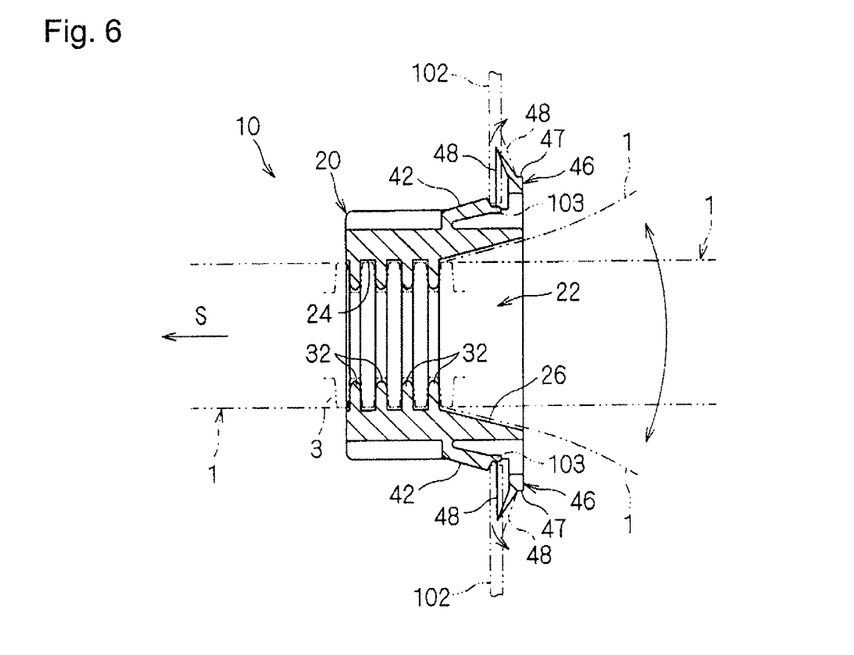
[FIG. 6] is a cross-sectional view along a line VI-VI in FIG. 4.

The installation hole 22 of the main body 20 includes a small space 24 and a large space 26 (see FIG. 6).

The small space 24 is a portion capable of positioning the wire harness 1 with respect to the through-hole 103 within a specific range in a radial direction relative to the center axis. The small space 24 is formed in a shape following the outer circumference of the wire harness 1 installed therein. In other words, due to contact with the outer circumference of the wire harness 1, the small space 24 can position the wire harness 1 in the radial direction relative to the center axis. More specifically, the small space 24 is formed in a shape following the outer circumference of the wire harness 1 (herein, the outer circumference of the peaks of the corrugated tube 3), i.e., a shape long in a first direction in which the pair of straight line portions links the pair of arced portions, as seen in a front view. In addition, a size of the small space 24 is set to be the same as or larger than (herein, slightly larger than) the outer circumference of the wire harness 1. The small space 24 is provided to a portion of the main body 20 on a forward side of the insertion direction S.

Figure 3:
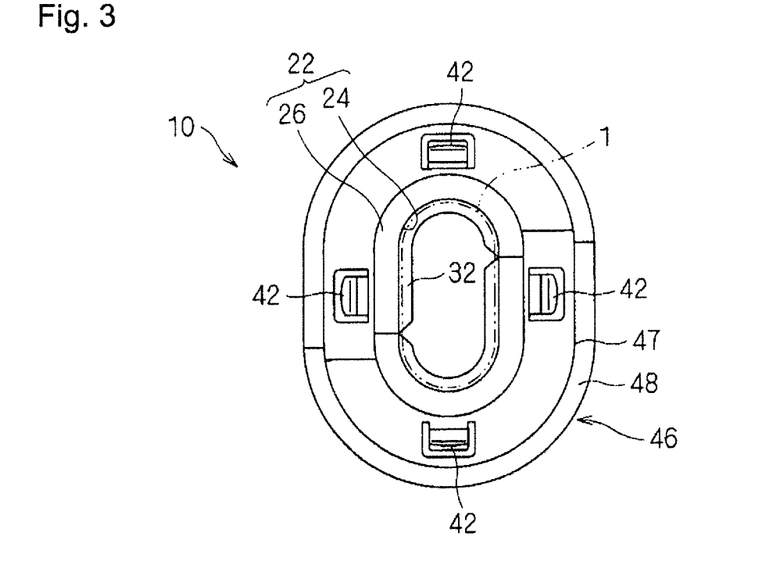
[FIG. 3] is a rear view of the edge protector.
Figure 4:
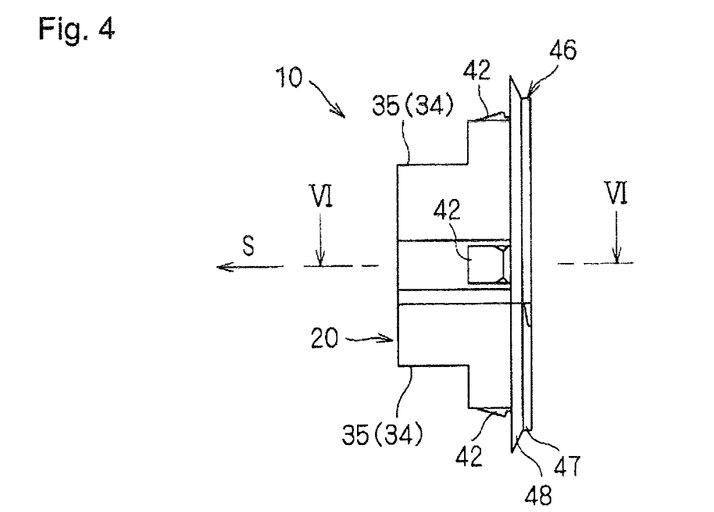
[FIG. 4] is a lateral view of the edge protector
[FIG. 5] is a plan view of the edge protector.
Figure 5:
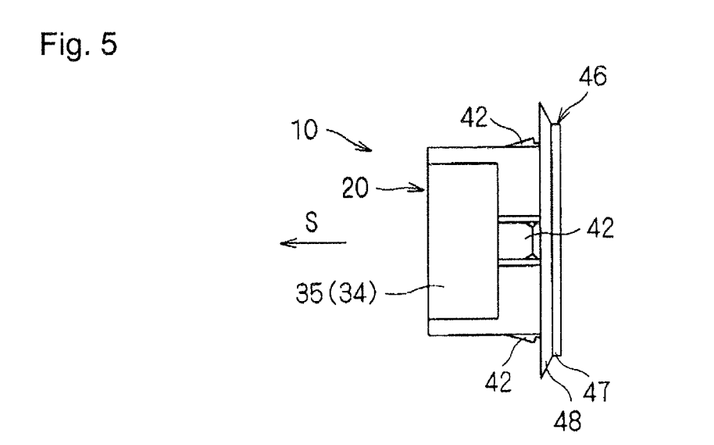

The large space 26 is provided to a portion including an insertion-direction-S rear end of the main body 20, and includes an interior space on at least one side of the small space 24 in the circumferential direction, the interior space expanding further than the small space 24 toward the outer periphery (see FIGS. 3 and 6). Herein, the large space 26 is provided continuous with a rear side of the small space 24 in the insertion direction S. The "at least one side of the small space 24 in the circumferential direction" refers to a portion on one side in a front view of the main body 20 overlapping with the small space 24 in a direction orthogonal to the insertion direction S.

Preferably, the large space 26 may be formed to expand further than the small space 24 toward the outer periphery in a direction in which the wire harness 1 is bent, the wire harness 1 being provided on an interior of the large space 26. Herein, the wire harness 1 to be protected is formed in a flat shape, and is bent chiefly in a minor axis direction as viewed in a cross-section orthogonal to the extension direction. In other words, the large space 26 is preferably formed in a shape expanding toward the outer periphery on at least one side of the small space 24 in a direction orthogonal to the major axis direction, as seen in a front view, the shape of the large space 26 corresponding to the shape of the wire harness 1. More specifically, as shown in Fig. 6, the large space 26 may be formed in a shape expanding further than the small space 24 toward the outer periphery in the entire circumferential direction.

In addition, the large space 26 is formed in a shape gradually expanding toward the outer periphery from a forward side to the rear end in the insertion direction S (see FIG. 6). In other words, the interior space of the large space 26 increases as it approaches the rear end in the insertion direction S. Herein, the large space 26 is set to a straight line shape inclined with respect to the insertion direction S, as viewed in a cross-section orthogonal to the circumferential direction. A degree of expansion of the large space 26 toward the outer periphery may be set according to an amount of bending deformation of the wire harness 1 to be protected. More specifically, in a state where the wire harness 1 is bent, the large space 26 may extend along an inner circumferential portion of a bend in the wire harness 1 (i.e., may be formed in a shape inclined to an angle corresponding to (substantially equal to) an angle of inclination of the wire harness 1 in the bent state, the angle being inclined with respect to the insertion direction S). However, the large space 26 may also be set to a curved line shape expanding in the outer peripheral direction toward the rear in the insertion direction S, as viewed in a cross-section orthogonal to the circumferential direction.

Moreover, a description is given using an example where the large space 26 is formed on the portion that includes the rear end of the main body 20 in the insertion direction S. However, the large space 26 may also be formed on a portion that includes the insertion-direction-S forward end, with the small space 24 therebetween, or on both insertion-direction-S ends. In other words, the large space 26 may be formed on a portion that includes at least one of the forward end and the rear end in the insertion direction S.

The positioning rib 32 is a portion positioning the wire harness 1 with respect to the main body 20 in the insertion direction S (see FIG. 6). The positioning rib 32 is formed in a shape extending along the circumferential direction and projecting toward the inner periphery from the small space 24 of the installation hole 22. In other words, the positioning rib 32 is formed so as to be capable of having peaks and valleys fit together with respect to the outer circumference of the corrugated tube 3 of the wire harness 1. In addition, a plurality of the positioning ribs 32 are provided in the insertion direction S at intervals fitting into the valleys of the corrugated tube 3.

The engagement structural part is formed in a shape that flares from the outer circumference of the main body 20 and is a portion capable of engaging in the through direction with the opening edge of the through-hole 103 (see FIG. 6). The engagement structural part includes a forward engagement part 42 and a rear engagement part 46.

The forward engagement part 42 is formed so as to be capable of engaging with the opening edge of the through-hole 103 from the forward side in the insertion direction S, and is a portion regulating escape of the main body 20 to the rear side in the insertion direction S. The forward engagement part 42 is provided at a midway portion of the main body 20 in the insertion direction S (see FIGS. 4 and 5). More specifically, the forward engagement part 42 has a base end fixated to the outer circumference of the main body 20 as well as a forefront end extending to the rear side in the insertion direction S as a free end. The forward engagement part 42 is thus set to be capable of elastic deformation in an inward-outward direction of the main body 20 with the base end as a pivot point (see FIG. 6). Herein, the forward engagement part 42 is formed in a shape gradually flaring toward the outer periphery of the main body 20 from the base end to the forefront end. In addition, the forward engagement part 42 includes an engagement surface on the forefront end thereof, the engagement surface facing the rear side in the insertion direction S. In a state preceding elastic deformation, at least a portion of the engagement surface is positioned further toward the outer periphery than the outer circumference of the main body 20. Also, by elastically deforming with the base end as the pivot point, the forward engagement part 42 is provided so as to be capable of projecting and receding with respect to the outer periphery more than the outer circumference of the main body 20.

Figure 2:
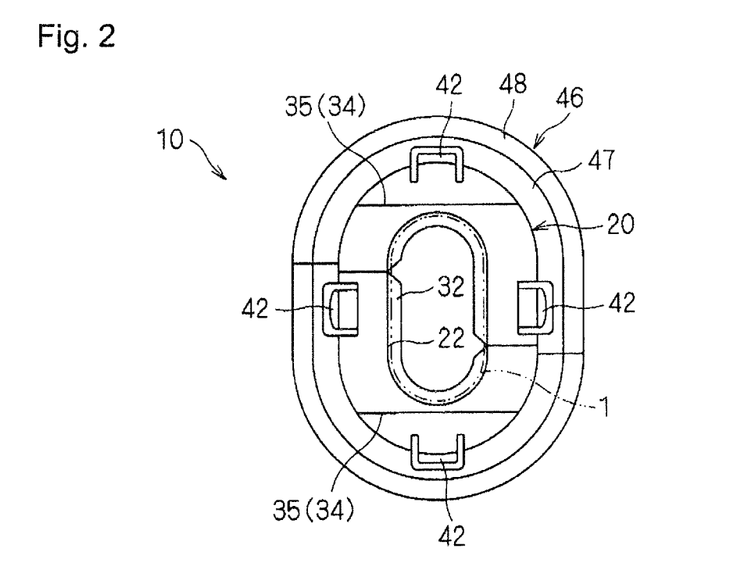
[FIG. 2] is a front view of the edge protector.

A plurality of the forward engagement parts 42 are provided at intervals in the circumferential direction of the main body 20 (see FIG. 2). Herein, the forward engagement parts 42 are provided at four locations at equal intervals in the circumferential direction of the main body 20.

The rear engagement part 46 is formed so as to be capable of engaging with the opening edge of the through-hole 103 from the rear side in the insertion direction S. The rear engagement part 46 is provided to the rear end of the main body 20 in the insertion direction S. The rear engagement part 46 includes a flange 47 and a bias 48.

The flange 47 is positioned so as to oppose the opening edge of the through-hole 103 from the rear side in the insertion direction S and is a portion regulating escape of the main body 20 to the forward side in the insertion direction S. The flange 47 is formed in an annular shape flaring from the outer circumference of the main body 20 toward the outer periphery along a direction orthogonal to the insertion direction S (see FIG. 2). The flange 47 is set to have an outer circumference larger than the through-hole 103. In addition, in a relationship with the flange 47, the forward engagement part 42 (engagement surface) is provided at a position spaced from the flange 47 at an interval equal to or larger than (herein, slightly larger than) a thickness of the panel 102.

The bias 48 is a portion contacting an outer circumferential portion of the through-hole 103 on the panel 102 from the rear side in the insertion direction S such that the panel 102 is between the bias 48 and the forward engagement part 42. The bias 48 is formed in an annular shape flaring toward the outer periphery from an outer peripheral portion of the flange 47 and having an outer peripheral portion projecting further forward in the insertion direction S than the flange 47 (see FIGS. 2 and 6). More specifically, the bias 48 is formed in a shape having the outer peripheral positioned spaced from the engagement surface of the forward engagement part 42 at an interval smaller than (herein, slightly smaller than) the thickness of the panel 102. The bias 48 is formed such that the outer peripheral portion is capable of elastic deformation toward the rear in the insertion direction S. Herein, the bias 48 is formed in a shape becoming gradually thinner approaching the outer peripheral portion.

In addition, when the main body 20 is inserted within the through-hole 103, the main body 20 is positioned such that the opening edge of the through-hole 103 is between the forward engagement part 42 and the flange 47. In this state, the main body 20 is retained in the panel 102 in the insertion direction S. In addition, the bias 48 biases the outer circumference of the through-hole 103 in the panel 102 and the panel 102 is held between the forward engagement part 42 and the bias 48. Accordingly, the main body 20 is positioned with respect to the panel 102 such that jostling is inhibited in the insertion direction S. At this point, the engagement surface of the forward engagement part 42 contacts the opening edge of the through-hole 103 from the forward side in the insertion direction S.

The forward engagement part 42 and the rear engagement part 46 are not limited to a case of being provided in the above-noted positions on the main body 20. Instead, the forward engagement part 42 and the rear engagement part 46 may be provided at a middle portion of the main body 20 in the insertion direction S, spaced such that the opening edge of the through-hole 103 is positioned therebetween.

In addition, the rear engagement part 46 is not limited to a case of being formed in an annular shape. Instead, the rear engagement part 46 may be formed intermittently in the circumferential direction of the main body 20. Further, the bias 48 may be omitted from the rear engagement part 46.

Figure 7:
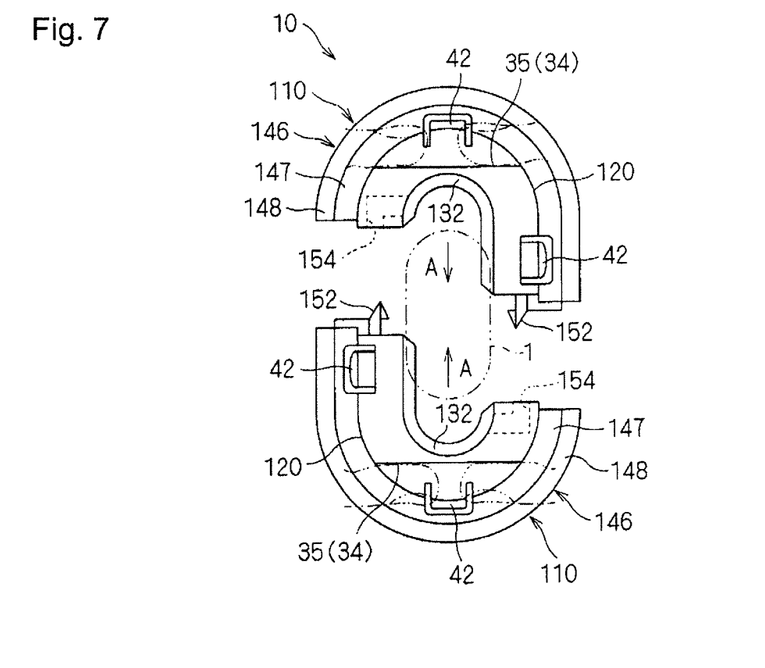
[FIG. 7] is a front view illustrating work to assemble a pair of separate members.

As noted above, the edge protector 10 is configured by assembling the pair of separate members 110 (see FIG. 7). Each of the separate members 110 is formed in a "J" shape, as seen in a front view. Herein, the pair of separate members 110 are formed to have the same shape. In addition, the pair of separate members 110 are assembled in a manner that end portions of each oppose each other so as to hold the wire harness 1 therebetween from both sides of the major axis direction, as viewed in a cross-section orthogonal to the extension direction.

The separate member 110 includes a divided main body 120, a divided rib 132, the forward engagement part 42 and a divided rear engagement part 146 as divided engagement structural parts, an engagement part 152, a receiver 154, and the pressure portion 34. Each part of the separate member 110 is integrally formed with a hard resin (for example, by extrusion molding) such as PP (polypropylene), PA (polyamide), and the like.

The divided main body 120 is a portion forming a circumferential direction portion of the main body 20. More specifically, the divided main body 120 is formed in a "J" shape, as seen in a front view, the "J" shape having an arced portion and a straight line portion linked to one end of the arced portion. Both end portions of the divided main bodies 120 of the pair of separate members 110 oppose each other to form the main body 20.

The divided rib 132 is a portion forming a circumferential direction portion of the positioning rib 32. More specifically, the divided rib 132 is formed in a peak shape extending along the circumferential direction and projecting toward the inner periphery from a portion of the inner circumference of the divided main body 120 forming a portion of the small space 24 of the main body 20. In addition, when the pair of separate members 110 are assembled with the wire harness 1 therebetween, each of the divided ribs 132 is fitted into the valleys of the corrugated tube 3. In an assembled state of the pair of separate members 110, the divided ribs 132 form the positioning ribs 32.

The forward engagement part 42 is provided at two locations, at a middle portion of the arced portion and a middle portion of the straight line portion of the divided main body 120.

The divided rear engagement part 146 is a portion forming a circumferential direction portion of the rear engagement part 46. More specifically, the divided rear engagement part 146 is formed in a shape flaring toward the outer periphery from an outer peripheral portion of the divided main body 120. In addition, in the assembled state of the pair of separate members 110, the divided rear engagement part 146 forms the rear engagement part 46.

The engagement part 152 and the receiver 154 are portions for maintaining the assembled state of the pair of separate members 110.

The engagement part 152 is provided to a first end (herein, an end on the straight line portion side) of the divided main body 120. More specifically, the engagement part 152 is formed in a shape having an arm projecting from the first end of the divided main body 120 and a protrusion jutting laterally from a forefront end of the arm. Herein, the protrusion juts toward the inner periphery of the divided main body 120 and is formed in a shape where a jutting dimension gradually increases from the forefront end of the arm toward a base end.

The receiver 154 is provided to a second end (herein, an end on the arced portion side) of the divided main body 120. The receiver 154 is a portion engaging with the engagement part 152 of the other separate member 110. The receiver 154 is formed in a recessed shape open at the end on the arced portion side of the divided main body 120, into which the engaged part 152 can be inserted. More specifically, the receiver 154 includes a hole, the protrusion of the engaged part 152 fitting into an interior of the hole. In other words, the hole is formed on the inner peripheral side of the divided main body 120 and opens on an inner peripheral wall surface.

In addition, when the pair of separate members 110 are assembled, the engagement part 152 on the first separate member 110 is inserted into the receiver 154 on the second separate member 110, and the protrusion on the engagement part 152 fits into the hole on the receiver 154. Thereby, the pair of separate members 110 cannot be separated in the assembly direction A and are maintained in the assembled state.

However, assembly of the engagement part 152 and the receiver 154 is not limited to the above. Instead, assembly may be configured such that an engagement part engages with a receiver due to the pair of separate members 110 opposing each other.

The pressure portion 34 is a portion for causing a force to act on each of the separate members 110 in the assembly direction A during work to assemble the pair of separate members 110. The pressure portion 34 is formed on the divided main body 120, at a location on the forward side of the forward engagement part 42 in the insertion direction S on the divided engagement structural part. The pressure portion 34 includes the pressure surface 35 facing rearward in the assembly direction A (see FIGS. 4 and 5). Herein, the pressure portion 34 is formed on a portion of the divided main body 120 that includes the middle portion of the arced portion, as seen in a front view. Preferably, as seen in a front view, the pressure portion 34 is formed in a shape having the pressure surface 35 on a portion overlapping with both ends of the divided main body 120 (more preferably, the engagement part 152 and the receiver 154) on the rear side in the assembly direction A (see FIG. 7).

In addition, when assembling the pair of separate members 110, the pair of separate members 110 face each other with the wire harness 1 therebetween, the separate members 110 oriented such that both ends of each of the separate members 110 are opposite each other. Then, the pressure surface 35 of each pressure portion 34 is pressed by a finger to cause a force to act forward in the assembly direction A (see FIG. 7). For example, index fingers of both hands may be placed on the pressure portion 34 of the first separate member 110 while thumbs of both hands may be placed on the pressure portion 34 of the second separate member 110, then each of the pressure portions 34 may be pressured as if pinched between the index fingers and thumbs. Moreover, FIG. 7 shows positions of the fingers during pressing in a two-dot-dashed line. Accordingly, each of the engagement parts 152 and the receivers 154 are engaged and the pair of separate members 110 are maintained in the assembled state, resulting in a state where the edge protector 10 is attached to the wire harness 1 (see FIG. 1).

The pressure portion 34 may also be formed with a pressure surface continuous with the above-noted locations and on a lateral portion of the forward engagement part 42. In addition, as seen in a front view, the pressure portion 34 may also be formed at two separate locations overlapping with each end portion of the divided main body 120 on the rear side in the assembly direction A.

In addition, the pressure portion 34 may also undergo non-slip processing such as adding texture to the pressure surface 35.

In the present embodiment, the edge protector 10 having the positioning ribs 32 is described as a configuration positioning the wire harness 1 in the insertion direction S with respect to the main body 20. However, instead of the positioning ribs 32, a projecting tab for positioning may be provided having a flat plate shape projecting forward from the forward end of the main body 20 in the insertion direction S. In other words, the wire harness 1 installed within the installation hole 22 is bundled to the positioning tab with tape, a band, or the like so as to be incapable of relative displacement, and can thus be positioned with respect to the main body 20.

According to the edge protector 10 according to the present embodiment, the installation hole 22 of the main body 20 inserted into the through-hole 103 includes the small space 24 and the large space 26. The small space 24 is provided to a forward portion in the insertion direction S and has a shape following the outer circumference of the wire harness 1. The large space 26 is provided to a portion including the rear end in the insertion direction S, and includes the interior space expanding further than the small space 24 toward the outer periphery on at least one side of the small space 24 in the circumferential direction. Therefore, the wire harness 1, a position thereof being regulated in the radial direction relative to the center axis of the main body 20 by the small space 24, can be bent even within the large space 26 with the position of the installation hole 22 as the pivot point, the position of the installation hole 22 being further forward than the insertion-direction-S rear end. In other words, the wire harness 1 can bend with respect to the panel 102 with the side further forward in the insertion direction S as the pivot point. Thus, even when bent at a location closer to the panel 102, a load accompanying the bending deformation can be alleviated and the wire harness 1 can be bent more readily.

In addition, according to a configuration where the large space 26 is formed in a shape gradually expanding toward the outer periphery from a forward side in the insertion direction S to the rear end, when the wire harness 1 is bent, the wire harness 1 can bend gently along the inner circumference of the large space 26 and a load on the wire harness 1 can be further alleviated by avoiding strong interference.

In addition, according to a configuration where the small space 24 is formed in a shape long in one direction, as seen in a front view, and the large space 26 is formed in a shape expanding toward the outer periphery on at least one side of the small space 24 in a direction orthogonal to the major axis direction of the small space 24, as seen in a front view, when the flat wire harness 1 is to be protected, the wire harness 1 can be bending deformed even within the large space 26 in the minor axis direction, which is the direction in which the wire harness 1 is chiefly bent. Accordingly, a load accompanying the bending deformation can be alleviated and the wire harness 1 can be bent more readily.

In addition, according to a configuration where the large space 26 is formed in a shape expanding toward the outer periphery further than the small space 24 in the entire circumferential direction, the load accompanying the bending deformation can be alleviated in the entire radial direction relative to the center axis of the installation hole 22, and the wire harness 1 can be bent more readily.

In addition, according to a configuration having the positioning ribs 32 projecting from the small space 24 of the installation hole 22 toward the inner periphery and extending along the circumferential direction, in a case where the wire harness 1 is protected, the wire harness 1 having the corrugated tube 3 mounted on the outer circumference of the bundled wires 2, the positioning ribs 32 fit together with the outer circumference (valleys) of the corrugated tube 3, and thus the wire harness 1 can be positioned in the center axis direction of the main body 20 in a more compact manner.

In addition, according to a configuration configured by the pair of separate members 110 being brought adjacent to each other in the assembly direction to be assembled in a tubular shape, by bringing the pair of separate members 110 adjacent for assembly with the wire harness 1 therebetween, the configuration can be attached to the wire harness 1 and the workability of attachment to the wire harness 1 can be improved. In addition, in a configuration where dimensions of the main body 20 in the insertion direction S are set to be comparatively large by providing the large space 26 as well as the small space 24 to the installation hole 22, the pressure portion 34 having the pressure surface 35 facing rearward in the assembly direction A is formed on the divided main body 120, at a location on the forward side of the forward engagement portion 42 in the insertion direction S on the divided engagement structural part. Thereby, a comparatively large size can be ensured for the pressure surface 35 on the pressure portion 34, and workability of assembling the pair of separate members 110 can be improved.

<Wire Harness Routing Structural Part>

Figure 8:
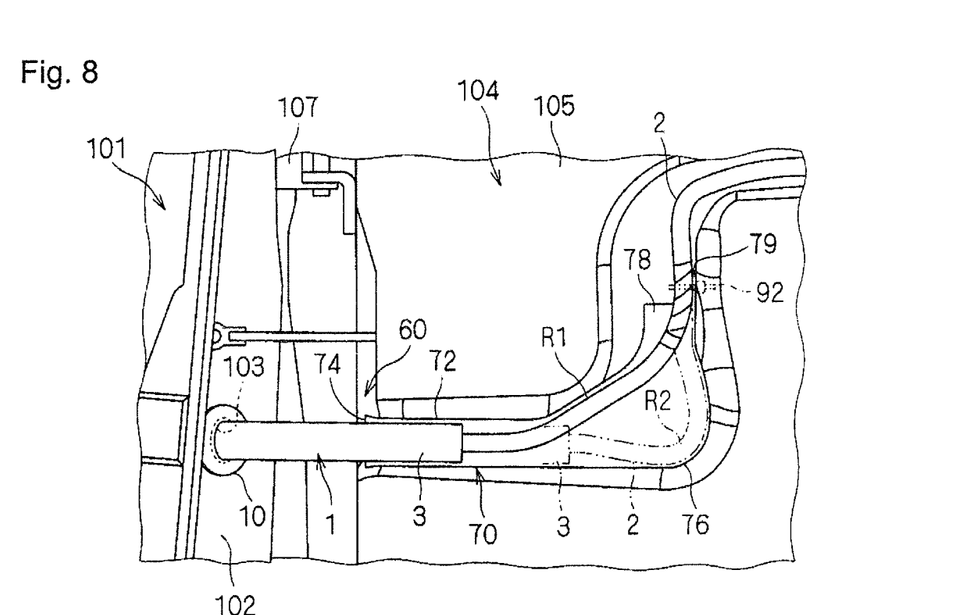
[FIG. 8] is a lateral view illustrating a wire harness routing structural part.
Figure 9:
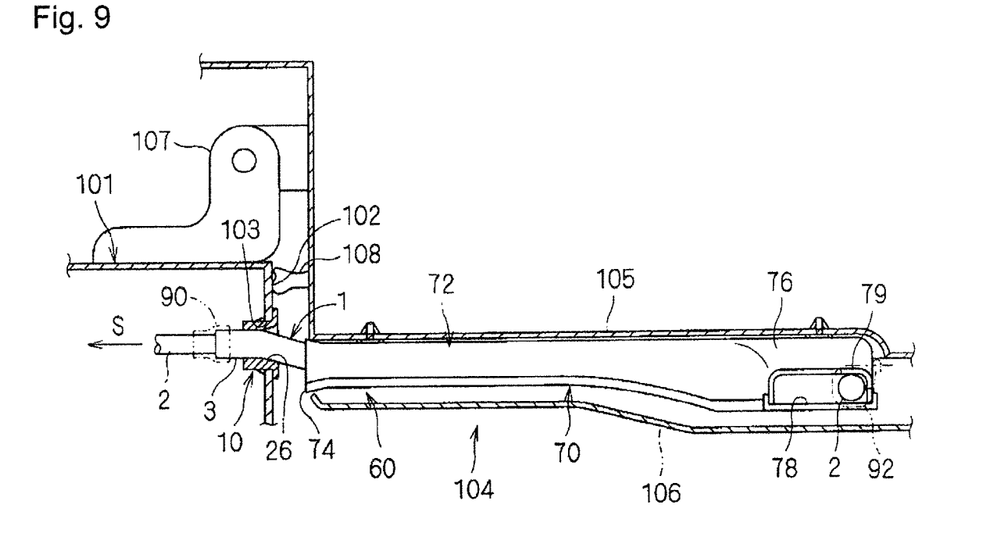
[FIG. 9] is a plan view illustrating the wire harness routing structural part in a state where a door is closed.
FIG. [10] is a plan view illustrating the wire harness routing structural part in a state where the door is open.
Figure 10:
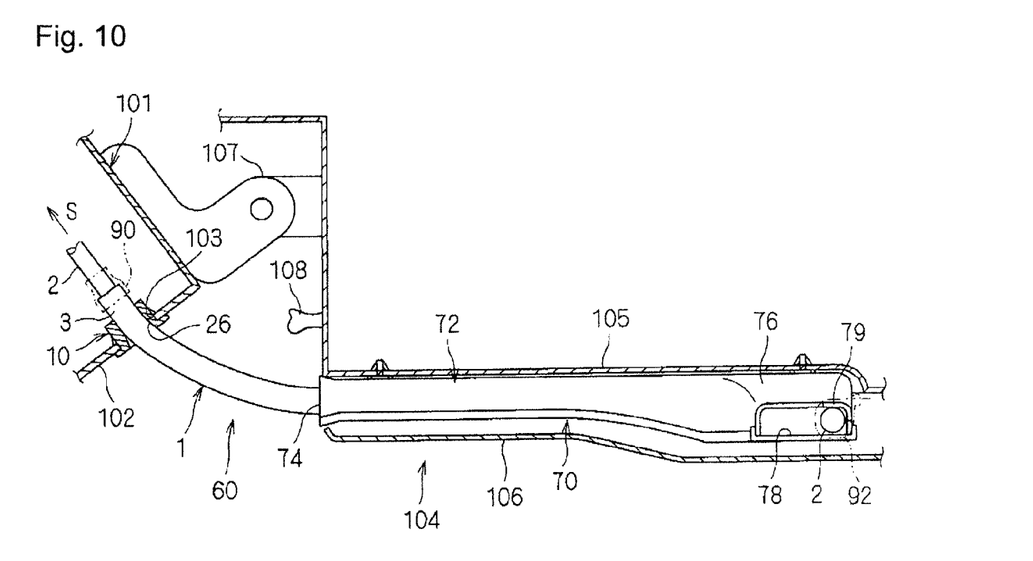

Next, a description is given of a wire harness routing structural part 60 using the edge protector 10 (see FIGS. 8 to 10). The wire harness routing structural part 60 is configured to route the wire harness 1 between a body 101 and a door 104 of a vehicle. The wire harness routing structural part 60 includes the wire harness 1, the edge protector 10, and an extra length absorption part 70.

For ease of description, the body 101 and the door 104 of the vehicle are now described. The body 101 is a portion configured by welding, for example, a frame and a panel formed with a metal material. The door 104 is connected to the body 101 by a hinge 107 or the like so as to be capable of opening and closing a boarding entrance formed on a lateral portion of the body 101. Herein, the door 104 is a front side door connected to the front pillar of the body 101. The door 104 includes an inner door panel 105, an outer door panel not shown in the drawings, and door trim 106. The inner door panel 105 is a member formed by press molding or punching a metal plate. The outer door panel is an outer sheathing member provided on a vehicle exterior side of the inner door panel 105. In addition, the door trim 106 is formed by a synthetic resin material or the like and is an inner sheathing member attached to a vehicle interior side of the inner door panel 105. Hereafter, for the door 104 and a portion of the wire harness routing structural part 60 located on the door 104, looking rearward from a forward side of the door 104 is treated as a front face and looking at the vehicle exterior side of the door from the vehicle interior side is treated as a lateral face.

The wire harness routing structural part 60 according to the present embodiment routes the wire harness 1 between the inner door panel 105 and the door trim 106 of the door 104 by passing the wire harness 1 through the through-hole 103 formed on the front pillar of the body 101 (see FIGS. 9 and 10). Hereafter, a portion of a panel positioned on a surface of the front pillar and having the through-hole 103 formed thereon is referred to simply as the panel 102.

The door 104 also includes a weather strip 108 for waterproofing along a peripheral edge. The weather strip 108 is a portion preventing leaks on the vehicle interior and exterior in a state where the door 104 is closed by tightly adhering to the inner periphery of the boarding entrance of the body 101. The weather strip 108 is formed by a flexible material such as rubber. In addition, the wire harness routing structural part 60 is configured such that the wire harness 1 is routed by the weather strip 108 toward the vehicle interior.

The wire harness routing structural part 60 includes the wire harness 1, the edge protector 10, and the extra length absorption part 70 (see FIG. 8). Moreover, configurations of the wire harness 1 and the edge protector 10 have already been noted; thus, a description is given here only for characteristics of the wire harness routing structural part 60.

In the wire harness routing structural part 60, the bundled wires 2 of the wire harness 1 are routed from within the body 101, through the through-hole 103, and into the door 104. In addition, the corrugated tube 3 is provided around an area that includes a portion of the bundled wires 2 spanning between the body 101 and the door 104 in a state where the door 104 is open. The corrugated tube 3 is formed in a flat shape; therefore, as viewed in a cross-section orthogonal to the extension direction, the corrugated tube 3 is readily bent in the minor axis direction and is unlikely to bend in the major axis direction. In addition, the corrugated tube 3 having greater rigidity than the bundled wires 2 is employed.

An end of the corrugated tube 3 on the body 101 side is fixated to a portion of the bundled wires 2 routed inside the body 101 by wrapping a tape 90 thereto, or the like. In addition, a portion near the body 101-side end is supported on the body 101 by the edge protector 10 (see FIGS. 9 and 10). The edge protector 10 is mounted on the portion of the corrugated tube 3 near the body 101-side end and is attached to the through-hole 103.

More specifically, the main body 20 of the edge protector 10 is inserted into the through-hole 103 in the insertion direction S from the door 104 side toward the interior of the body 101. In other words, the large space 26 can be said to be formed on a portion that includes a door 104-side end of the installation hole 22 in the insertion direction S (see FIGS. 9 and 10). Further, the wire harness 1 is installed within the installation hole 22 of the main body 20. In this state, the positioning ribs 32 fit together with the outer circumference of the corrugated tube 3 of the wire harness 1. In other words, the wire harness 1 is positioned within the small space 24 and is maintained in a state capable of bending deformation within the large space 26 (see FIG. 6).

Herein, the large space 26 is formed in a shape expanding further than the small space 24 toward the outer periphery in the entire circumferential direction. However, the large space 26 may also be formed in a shape expanding further than the small space 24 toward the outer periphery in at least one direction of the small space 24 in the circumferential direction (a side to which the wire harness 1 is bent). Moreover, when considering that the wire harness 1 is bent toward the vehicle exterior accompanying an operation to open the door 104, the large space 26 is preferably formed in a shape expanding toward the outer periphery at least further than the small space 24 on the vehicle exterior side.

In addition, the first engagement part 42 engages with the opening edge of the through-hole 103 from the body 101 (forward) side in the insertion direction S, and the second engagement part 46 engages with the opening edge of the through-hole 103 from the door 104 (rear) side in the insertion direction S (see FIG. 6). Herein, the second engagement part 46 is maintained in a state where the flange 47 (or 147 as similarly shown in FIG. 7) is opposite the opening edge of the through-hole 103 from the door 104 side in the insertion direction S (irrespective of contact) and the outer peripheral portion of the bias 48 (or 148 as similarly shown in FIG. 7) abuts the outer peripheral portion of the through-hole 103 on the panel 102.

Herein, the edge protector 10 is fixated to the through-hole 103 in a manner such that the major axis of the corrugated tube 3 follows the vertical direction (connection axis direction of the hinge 107). Thereby, bending of the bundled wires 2 installed within the corrugated tube 3 is regulated in the vertical direction and sagging is inhibited, while the bundled wires 2 are readily bending-deformed in the horizontal direction (on a plane of the open/close operation of the door 104). In addition, the bundled wires 2 are connected more smoothly with respect to the open/close operation of the door 104.

The extra length absorption part 70 is a part accommodating a portion of the wire harness 1 routed within the door 104 with space enabling the wire harness 1 to be redirected (see FIG. 8). The extra length absorption part 70 includes a guide portion 72 and an accommodation part 76. As an overview, the extra length absorption part 70 is formed in a shape guiding, with the guide part 72, an advance/retreat path of a portion of the corrugated tube that includes the door 104-side end and accommodating, with the accommodation part 76, the bundled wires 2 with space enabling the bundled wires 2 to be redirected, the bundled wires 2 extending out from the door 104-side end of the corrugated tube 3. Herein, the extra length absorption portion 70 is a molded resin article also referred to as a protector (configured, for example, by two members: a recessed member and a lid-shaped member), and protects the wire harness 1 from nearby members within the door 104.

The extra length absorption part 70 includes, on the guide part 72, an insertion opening 74 into which the corrugated tube 3 that covers the wire harness 1 is inserted. In addition, the extra length absorption part 70 includes, on the accommodation part 76, an extraction opening 78 for extracting the wire harness 1 to an interior of the door 104. Herein, a description is given of an example where the insertion opening 74 and the extraction opening 78 run through the extra length absorption part 70 in substantially orthogonal directions and the extra length absorption part 70 is formed in substantially an overall "L" shape in a lateral view.

The guide part 72 includes the insertion opening 74 on a body 101-side end and has a door 104-side end formed in a tubular shape linked with the accommodation part 76. More specifically, the guide part 72 includes an interior space larger than an exterior shape of the corrugated tube 3. In addition, by contacting the outer circumference of the corrugated tube 3 inserted through the insertion opening 74, the guide part 72 regulates a path in the radial direction relative to the center axis of the corrugated tube 3.

In addition, the insertion opening 74 of the guide part 72 is formed in a shape gradually expanding in the outer peripheral direction toward an opening end portion. The opening end portion of the insertion opening 74 may also be formed in a rounded shape.

The accommodation part 76 is a portion continuous with a second end side (rear side) of the guide part 72 and includes an absorption space capable of absorbing the bundled wires 2 with a space enabling redirection of the bundled wires 2, the bundled wires 2 extending out from the door 104-side end of the corrugated tube 3, which is guided to the interior by the guide part 72. In addition, the extraction opening 78 of the accommodation part 76 is provided at a site where the absorption space is between the extraction opening 78 and the guide part 72.

The accommodation part 76 is formed to be capable of accommodating the wire harness 1, which extends out from the door 104-side end of the corrugated tube 3, so as to enable the extra length of the wire harness 1 to be redirected and absorbed by bending the wire harness 1 between a first path R1 and a second path R2 bulging such that a middle portion of the second path R2 is distant from the first path R1 (see FIG. 8).

More specifically, the accommodation part 76 includes a first wall and a second wall facing each other with the accommodating space therebetween, as seen in a lateral view. The bundled wires 2 accommodated within the accommodating space are installed so as to approach the first wall when following the first path R1 and so as to approach the second wall when following the second path R2. In other words, in a state where the bundled wires 2 follow the first path R1, a space exists which enables the bundled wires 2 to be redirected toward the second wall. More specifically, the first wall extends in substantially a straight line shape linking the rear end of the guide part 72 with the extraction opening 78 of the accommodation part 76 on an inner circumferential side of the extra length absorption part 70, the extra length absorption part 70 having substantially an "L" shape as seen in a lateral view. In addition, the second wall extends in substantially an "L" shape linking the rear end of the guide part 72 with the extraction opening 78 on the outer circumferential side of the extra length absorption part 70, the extra length absorption part 70 having substantially an "L" shape as seen in a lateral view, while leaving a gap the size of the absorption space with the first wall. In other words, the accommodation part 76 is formed in substantially a right-angle triangular shape in which the first wall is the hypotenuse, as seen in a lateral view. Moreover, FIG. 8 shows the accommodation part 76 having a site on the second wall on a rear side of the guide part 72 formed in a shape swelling slightly in a direction separating from the guide part 72 (toward the rear side).

Also, in a state where the door 104 is open, the bundled wires 2 extending out from the door 104-side end of the corrugated tube 3 are accommodated in the accommodation part 76 in a configuration where the bundled wires 2 follow the first path R1, which leaves the space enabling redirection toward the second wall. In addition, in a state where the door 104 is closed, the accommodation part 76 accommodates the bundled wires 2 in a configuration where the bundled wires 2 follow the second path R2, which is longer than the first path R1.

In addition, the accommodation part 76 includes an extraction point positioner 79 capable of fixating the bundled wires 2 at the extraction opening 78. Herein, the extraction point positioner 79 is formed in a shape in which an opening end portion of the extraction opening 78 partially extends. Also, the bundled wires 2 extracted through the extraction opening 78 can be positioned with respect to the extra length absorption part 70 by fastening the bundled wires 2 together with the extraction point positioner 79 using a bundling band 92. However, the bundled wires 2 may also be fixated to the extraction point positioner 79 by tape winding.

In addition, the extra length absorption part 70 is installed in a gap between the inner door panel 105 and the door trim 106 in an orientation where the insertion opening 74 opens toward the front on a forward side end of the door 104 and the extraction opening 78 opens upward. Further, in a state where the door 104 is closed, a position of the extra length absorption part 70 is a position where the insertion opening 74 is located further toward the vehicle interior than the installation hole 22 of the edge protector 10 (see FIGS. 9 and 10). In other words, the wire harness 1 routed into the door 104 from the body 101 is, in a state where the door 104 is closed, bent toward the vehicle interior from the edge protector 10 and inserted into the insertion opening 74 of the extra length absorption part 70. When considering that the wire harness 1 is bent toward the vehicle interior in the edge protector 10, the large space 26 is preferably formed in a shape expanding further than the small space 24 toward the outer periphery on the vehicle interior side.

The extra length absorption part 70 may be fixated, for example, by a clamp fitting together with a hole formed in the inner door panel 105. FIGS. 9 and 10 show the extra length absorption part 70 in which clamps are provided to each of the guide part 72 and the accommodation part 76. Herein, the clamp refers to a configuration including, for example, a column projecting from the outer circumference of the extra length absorption part 70, an engagement part flaring toward the outer periphery from a forefront end of the column, and a plate spring provided to a base end of the column with a space between the plate spring and the engagement part. In addition, the extra length absorption part 70 may also be fixated to the inner door panel 105 by screwing down, bolting down, stud-bolting, bracket fixation, or the like. Also, the extra length absorption part 70 may be fixated to the door trim 106.

The shape of the extra length absorption part 70 described above is exemplary and various other shapes can be employed. Specifically, the extra length absorption part 70 may have any configuration capable of accommodating the bundled wires 2, which are inserted through the insertion opening 74, so as to leave a space enabling redirection by the accommodation part 76, and may be shaped in consideration of the shape of the door 104 or the like according to vehicle model. In addition, a description is given using an example where the extra length absorption part 70 is a molded resin article separate from the door 104. However, the extra length absorption part 70 may also be a portion configured by portions of the inner door panel 105 and the door trim 106.

Herein, a description is given using an example where the insertion opening 74 of the extra length absorption part 70 is positioned further toward the vehicle interior than the installation hole 22 of the edge protector 10. However, the present invention is not limited to this. In other words, when the insertion opening 74 of the extra length absorption part 70 is so positioned, the edge protector 10 having the large space 26 can achieve even more marked results.

The wire harness routing structural part 60 may modularize the wire harness 1 routed into the door 104 from the body 101, the edge protector 10, and the extra length absorption part 70 and assemble the components before assembling the vehicle. In other words, the edge protector 10 is mounted on a portion of the wire harness 1 near one end of the corrugated tube 3. In addition, the portion including the second end of the corrugated tube 3 is installed within the guide part 72 of the first member 76 of the extra length absorption part 70, while the bundled wires 2 extending out from the second end of the corrugated tube 3 are accommodated within the accommodation part 76 and extracted through the extraction opening 78. The bundled wires 2 extracted through the extraction opening 78 are fixated to the extraction point positioner 79 by the bundling band 92.

To this point, a description has been given of an example where the wire harness 1 is bent in the minor axis direction (vehicle interior-exterior direction) as viewed in a cross-section orthogonal to the extension direction. However, when the wire harness 1 is bent in the major axis direction (vertical direction) as viewed in cross-section, the large space 26 employs a shape expanding further than the small space 24 toward the outer periphery in the major axis direction in the cross-sectional view orthogonal to the insertion direction S of the small space 24. Thereby, the load accompanying the bending deformation of the wire harness 1 can be alleviated and bending performance can be improved.

Further, a description is given using an example where the wire harness routing structural part 60 is applied to the door 104 as a front side door. However, the wire harness routing structural part 60 may also be applied to a rear side door or the like. In such a case, the bundled wires 2 span between a center pillar (a pillar between the front side door and the rear side door) and the rear side door. In other words, a through-hole is formed on the center pillar and the edge protector 10 is attached thereto.

According to the wire harness routing structural part 60 according to the present embodiment, the wire harness 1 is supported by the body 101 using the edge protector 10, which includes the large space 26 having the interior space expanding further than the small space toward the outer periphery on at least one side of the small space 24 in the circumferential direction. Therefore, accompanying an open/close operation of the door 104, or the like, the wire harness 1 is bent by the door 104-side end in the insertion direction S even within the large space 26 with the position on the body 101 side as the pivot point. Accordingly, the load from the bending deformation of the wire harness 1 accompanying the open/close operation of the door 104 can be alleviated and the bending performance can be improved.

In addition, the insertion opening 74 of the extra length absorption part 70 is provided further toward the vehicle interior than the installation hole 22 of the edge protector 10 in a state where the door 104 is closed, and the large space 26 of the edge protector 10 is formed in a shape expanding further than the small space 24 toward the outer periphery on both sides of the vehicle interior/exterior direction. According to such a configuration, the wire harness 1, which is bent toward the vehicle interior in order to be routed in the closed state of the door 104, is bent more gently by the door 104-side end of the edge protector 10 in the insertion direction S even within the large space 26 with the body 101 side as the pivot point, and is bent more gently toward the vehicle exterior when the door 104 is operated to open.

In addition, according to a configuration where the large space 26 is formed in a shape expanding further than the small space 24 toward the outer periphery in the entire circumferential direction, the wire harness 1 is bent more gently even in a case where the wire harness 1 undergoes bending deformation in the vertical direction in addition to bending deformation in the vehicle interior/exterior direction.

A detailed description is given above for the edge protector 10 and the wire harness routing structural part 60. However, the above description is in all respects illustrative and the present invention is not limited thereto. Numerous modifications not named as examples are understood to be conceivable without deviating from the scope of the present invention.

DESCRIPTION OF REFERENCE NUMERALS

1 Wire harness
2 Bundled wires
10 Edge protector
20 Main body
22 Installation hole
24 Small space
26 Large space 32 Positioning rib
34 Pressure portion
35 Pressure surface
42 Forward engagement part
46 Rear engagement part
60 Wire harness routing structural part
70 Extra length absorption part
74 Insertion opening
101 Body
102 Panel
103 Through-hole
104 Door
110 Separate member
120 Divided main body
146 Divided rear engagement part
A Assembly direction
S Insertion direction

The invention claimed is:

1. A harness protector attached to an opening edge of a through-hole in a panel having a wire harness comprising bundled wires passed therethrough, the harness protector comprising:
   a tubular main body configured to be inserted into the through-hole in an insertion direction and including an installation hole enabling the wire harness to be installed; and
   an engagement structural part formed in a shape that flares from an outer circumference of the main body and configured to engage in a through direction of the through-hole with the opening edge of the through-hole, wherein
   the installation hole includes a small space formed in a shape following the outer circumference of the wire harness and configured to position the wire harness with respect to the through-hole in a radial direction relative to a center axis, and a large space provided to a portion including at least one of a forward end and a rear end in the insertion direction, the large space including an interior space expanding further than the small space toward an outer periphery on at least one side of the small space in a circumferential direction,
   the harness protector being configured by a pair of separate members brought adjacent in an assembly direction and assembled in a tubular shape,
   each of the separate members integrally comprising:
      a divided main body forming a portion of the main body;
      a divided engagement structural part forming a portion of the engagement structural part; and
      a pressure portion on the divided main body at a location on a forward side of the divided engagement structural part in the insertion direction, the pressure portion including a pressure surface facing rearward in the assembly direction, and the pressure portion, as seen in a front view, is formed in a shape having the pressure surface on a portion overlapping with both ends of the divided main body on a rear side in the assembly direction, and wherein
   the pressure surface is oriented in a plane that extends parallel to the insertion direction,
   wherein the divided engagement structural part includes a forward engagement part and a rear engagement part, and wherein the forward engagement part and the pressure surface defines a step portion at a circumference of the divided main body.

2. The harness protector according to claim 1, wherein the large space is formed in a shape gradually expanding in an outer peripheral direction toward one of the forward end and the rear end in the insertion direction.

3. The harness protector according to claim 1, wherein the small space is formed in a shape long in one direction as seen in a front view, and the large space is formed in a shape expanding toward the outer periphery on at least one side of the small space in a direction orthogonal to a major axis direction of the small space, as seen in a front view.

4. The harness protector according to claim 1, wherein the large space is formed in a shape expanding further than the small space toward the outer periphery in the entire circumferential direction.

5. The harness protector according to claim 1, wherein the harness protector further includes a positioning rib projecting from the small space of the installation hole toward the inner periphery and extending along the circumferential direction.

6. A wire harness routing structural part for routing a wire harness comprising bundled wires between a body of a vehicle and a door through a through-hole formed on the body, the wire harness routing structural part comprising:
   the wire harness;
   a harness protector including a tubular main body inserted into the through-hole in an insertion direction and having an installation hole in which the wire harness is installed, and an engagement structural part formed in a shape that flares from an outer circumference of the main body and configured to engage in a through direction of the through-hole with an opening edge of the through-hole, the installation hole including a small space having a shape following the outer circumference of the wire harness and a large space provided to a portion including a door- side end in the insertion direction, the large space including an interior space expanding further than the small space toward an outer periphery on at least one side of the small space in a circumferential direction, the harness protector being configured by a pair of separate members
   brought adjacent in an assembly direction and assembled in a tubular shape, each of the separate members being integrally comprising:
   a divided main body forming a portion of the main body;
   a divided engagement structural part forming a portion of the engagement structural part; and
   a pressure portion on the divided main body at a location on a forward side of the divided engagement structural part in the insertion direction, the pressure portion including a pressure surface facing rearward in the assembly direction, wherein
   the pressure portion, as seen in a front view, is formed in a shape having the pressure surface on a portion overlapping with both ends of the divided main body on a rear side in the assembly direction, and wherein
   the pressure surface is oriented in a plane that extends parallel to the insertion direction; and
   an extra length absorption part accommodating a portion of the wire harness routed within the door with a space enabling the wire harness to be redirected,
   wherein the divided engagement structural part includes a forward engagement part and a rear engagement part, and wherein the forward engagement part and the pressure surface defines a step portion at a circumference of the divided main body.

7. The wire harness routing structural part according to claim 6, wherein the extra length absorption part includes, further toward a vehicle interior than the installation hole of the harness protector, an insertion opening into which the wire harness is inserted, and
   the large space of the harness protector is formed in a shape expanding further than the small space toward the outer periphery on both sides of a vehicle interior/exterior direction of the small space.

8. The wire harness routing structural part according to claim 6, wherein the large space of the harness protector is formed in a shape expanding further than the small space toward the outer periphery in the entire circumferential direction.

* * * * *